United States Patent
Tian et al.

(10) Patent No.: US 9,768,811 B2
(45) Date of Patent: Sep. 19, 2017

(54) PRE-DISTORTION SYSTEM AND METHOD (71) Applicant: Huawei Technologies Co., Ltd., Shenzhen (CN)

(72) Inventors: Tingjian Tian, Chengdu (CN); Yanqing Zhao, Chengdu (CN); Yunfu Dou, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/338,079

(22) Filed: Oct. 28, 2016

(65) Prior Publication Data
US 2017/0047954 A1   Feb. 16, 2017

Related U.S. Application Data (63) Continuation of application No. PCT/CN2014/076632, filed on Apr. 30, 2014.

(51) Int. Cl.
*H04B 1/04* (2006.01)
*H04L 27/36* (2006.01)

(52) U.S. Cl.
CPC ......... *H04B 1/0475* (2013.01); *H04L 27/368* (2013.01); *H04B 2001/0425* (2013.01); *H04B 2001/0433* (2013.01)

(58) Field of Classification Search
CPC ............... H04B 1/0475; H04B 1/0483; H04B 2001/0425; H04B 1/62; H04L 27/368; H04L 27/367

(Continued)

(56) References Cited

U.S. PATENT DOCUMENTS 7,062,233 B2 *  6/2006  Huttunen .............. H04L 27/368
                                                      455/108
7,170,345 B2 *  1/2007  Hongo ................... H03F 1/3241
                                                      330/149

(Continued)

FOREIGN PATENT DOCUMENTS

CN    102118334 A    7/2011
CN    102163956 A    8/2011
CN    103718456 A    4/2014

OTHER PUBLICATIONS

Bassam et al., "2-D Digital Predistortion (2-D-DPD) Architecture for Concurrent Dual-Band Transmitters," IEEE Transactions on Microwave Theory and Techniques, vol. 59, No. 10, pp. 2547-2554, Institute of Electrical and Electronics Engineers, New York, New York (Oct. 2011).

(Continued)

*Primary Examiner* — Sonny Trinh
(74) *Attorney, Agent, or Firm* — Leydig, Voit & Mayer, Ltd.

(57) ABSTRACT

Embodiments of the present invention disclose a pre-distortion system, including a pre-distortion circuit, a transmission circuit, a power amplifier, a feedback circuit, and a learning circuit. The pre-distortion circuit acquires an in-band intermodulation distortion model coefficient vector, a cross-band modulation distortion model coefficient vector, and an out-of-band intermodulation distortion model coefficient vector that are learned by the learning circuit according to an output signal of the power amplifier, and performs pre-distortion processing on an input digital intermediate frequency signal. Correspondingly, the embodiments of the present invention further disclose a pre-distortion method, which can eliminate impact caused by out-of-band intermodulation distortion on the power amplifier.

8 Claims, 5 Drawing Sheets (58) Field of Classification Search
USPC .......................... 455/114.3, 501, 63.1, 67.13
See application file for complete search history.

(56) References Cited

U.S. PATENT DOCUMENTS

| | | | | | |
|---|---|---|---|---|---|
| 7,289,773 | B2* | 10/2007 | Braithwaite | .......... | H03F 1/3235 375/297 |
| 7,728,665 | B2* | 6/2010 | Watanabe | .............. | H03F 1/3247 330/149 |
| 8,285,770 | B1* | 10/2012 | Barnes | ................. | H03F 1/3247 708/300 |
| 8,391,809 | B1* | 3/2013 | Fuller | ................. | H04B 1/0475 455/114.3 |
| 8,467,747 | B2* | 6/2013 | Kim | ...................... | H03F 1/3247 330/149 |
| 8,594,231 | B2* | 11/2013 | Ohkawara | .............. | H03F 1/3247 375/149 |
| 8,620,233 | B2* | 12/2013 | Brobston | ..................... | 330/107 |
| 8,903,337 | B2* | 12/2014 | Kim | ...................... | H03F 1/3247 375/296 |
| 9,362,876 | B2* | 6/2016 | Gao | ..................... | H03G 1/0005 |
| 9,385,762 | B2* | 7/2016 | Laporte | ................ | H04B 1/0475 |
| 2013/0094610 | A1 | 4/2013 | Ghannouchi et al. | | |
| 2013/0200950 | A1 | 8/2013 | Bai | | |
| 2014/0191799 | A1 | 7/2014 | Ohkawara et al. | | |

OTHER PUBLICATIONS

Kim et al., "A Generalized Architecture for the Frequency-Selective Digital Predistortion Linearization Technique," IEEE Transactions on Microwave Theory and Techniques, vol. 61, No. 1, pp. 596-605, Institute of Electrical and Electronics Engineers, New York, New York (Jan. 2013).

Bassam et al., "Channel-Selective Multi-Cell Digital Predistorter for Multi-Carrier Transmitters," IEEE Transactions on Communications, vol. 60, No. 8, pp. 2344-2352, Institute of Electrical and Electronics Engineers, New York New York (Aug. 2012).

* cited by examiner

PRE-DISTORTION SYSTEM AND METHOD

CROSS-REFERENCE TO RELATED APPLICATIONS

This application is a continuation of International Application No. PCT/CN2014/076632, filed on Apr. 30, 2014, the disclosure of which is hereby incorporated by reference in its entirety.

TECHNICAL FIELD

The present disclosure relates to the communications field, and in particular, to a pre-distortion apparatus and method.

BACKGROUND

In a current communications system, a radio frequency unit is an important component, and a power amplifier (PA) is an important radio frequency device thereof, and has a function of amplifying an input signal. However, the PA may bring in nonlinear distortion. That is, an output signal and an input signal are in a nonlinear amplification relationship. In addition, if the input signal is a broadband signal, the PA may have a memory effect. That is, the output signal is not only correlated with an input signal that is at a current time point, but also correlated with input signals that are at some earlier time points. The nonlinear distortion and the memory effect may cause impact in two aspects on a signal output by the PA: One is an increase of in-band distortion of the signal, which causes that a receive end cannot correctly receive the signal; and the other is an increase of out-of-band power leakage of the signal, which causes interference on a communications system of an adjacent band.

A method for reducing a nonlinear distortion effect of a PA in the prior art is to use digital pre-distortion (DPD). The DPD is a very effective method for reducing nonlinear distortion of a signal output by the PA, and is widely used in the industry. Specifically, a DPD module is located before the PA. A nonlinear component generated by an input digital intermediate frequency signal according to a pre-distortion model offsets a nonlinear component generated by the PA, thereby fulfilling a purpose of improving output linearity of the PA.

However, in a scenario in which a multiband signal is amplified, the existing DPD technology cannot effectively eliminate out-of-band intermodulation distortion.

SUMMARY

A technical problem to be resolved by embodiments of the present invention is to provide a pre-distortion system and method, which can resolve a disadvantage of the prior art that out-of-band intermodulation distortion cannot be eliminated.

To resolve the foregoing technical problem, a first aspect of the embodiments of the present invention provides a pre-distortion system, including:

a pre-distortion circuit, configured to generate N pre-distortion output signals according to N digital intermediate frequency signals of different bands, N pre-distortion model coefficient vector sets generated by a learning circuit, and N preset digital frequency conversion coefficient vector sets, where each pre-distortion model coefficient vector set includes one in-band intermodulation distortion model coefficient vector, one cross-band modulation distortion model coefficient vector, and at least one out-of-band intermodulation distortion model coefficient vector, and N is an integer greater than 2;

a transmission circuit, configured to generate a radio frequency analog signal according to the N pre-distortion output signals generated by the pre-distortion circuit;

a power amplifier, configured to perform amplification processing according to the radio frequency analog signal generated by the transmission circuit, so as to generate a radio frequency analog signal that has undergone the amplification processing;

a feedback circuit, configured to generate N digital intermediate frequency feedback signals according to the radio frequency analog signal that is generated by the power amplifier and that has undergone the amplification processing; and the learning circuit, configured to generate N new pre-distortion model coefficient vector sets according to the N pre-distortion output signals generated by the pre-distortion circuit and the N digital intermediate frequency feedback signals generated by the feedback circuit.

With reference to the first aspect, in a first possible implementation manner, the pre-distortion circuit includes:

a first sub-circuit, configured to generate N pre-distortion model vector sets $B_1, B_2, \ldots, B_S, \ldots$, and $B_N$ according to the N digital intermediate frequency signals, where $1 \leq S \leq N$, $B_S=(B_S^{(in)}, B_S^{(cross)}, B_S^{(out)_1}, B_S^{(out)_2}, \ldots, B_S^{(out)_P})$, P is a quantity of out-of-band intermodulation distortion components corresponding to $B_S$, $B_S^{(in)}$ is an in-band intermodulation distortion model vector in $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$;

a second sub-circuit, configured to acquire the N pre-distortion model coefficient vector sets $\omega_1, \omega_2, \ldots, \omega_S, \ldots$, and $\omega_N$ generated by the learning circuit, where $\omega_S=(\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$;

a third sub-circuit, configured to generate the N preset digital frequency conversion coefficient vector sets $F_1, F_2, \ldots, F_S, \ldots$, and $F_N$, where $F_S=(F_S^{(in)}, F_S^{(cross)}, F_S^{(out)_1}, F_S^{(out)_2}, \ldots, F_S^{(out)_P})$ $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(out)_P}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal; and a fourth sub-circuit, configured to generate the N pre-distortion output signals $y_1, y_2, \ldots, y_S, \ldots$, and $y_N$ according to the N pre-distortion model vector sets, the N pre-distortion model coefficient vector sets, and the N preset digital frequency conversion coefficient vector sets, where $y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}$.

With reference to the first aspect or the first possible implementation manner of the first aspect, in a second possible implementation manner, the pre-distortion system further includes:

a preprocessing circuit, configured to generate the N digital intermediate frequency signals according to N baseband signals of different bands, and input the N digital intermediate frequency signals into the pre-distortion circuit.

With reference to the first possible implementation manner of the first aspect, in a third possible implementation manner, the learning circuit specifically determines an $S^{th}$ pre-distortion model coefficient vector set in the N new pre-distortion model coefficient vector sets by using the following formulas:

$$\omega_S = (U_1^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

where Q is a quantity of sampling points of an $S^{th}$ digital intermediate frequency feedback signal, and $u_S$ is a pre-distortion learning vector set generated according to the $S^{th}$ digital intermediate frequency feedback signal and an $S^{th}$ digital frequency conversion coefficient vector set.

A second aspect of the embodiments of the present invention provides a pre-distortion method, including:

generating N pre-distortion output signals according to N digital intermediate frequency signals of different bands, N pre-distortion model coefficient vector sets, and N preset digital frequency conversion coefficient vector sets, where each pre-distortion model coefficient vector set includes one in-band intermodulation distortion model coefficient vector, one cross-band modulation distortion model coefficient vector, and at least one out-of-band intermodulation distortion model coefficient vector, and N is an integer greater than 2;

generating a radio frequency analog signal according to the N pre-distortion output signals;

performing amplification processing according to the radio frequency analog signal, so as to generate a radio frequency analog signal that has undergone the amplification processing;

generating N digital intermediate frequency feedback signals according to the radio frequency analog signal that has undergone the amplification processing; and generating N new pre-distortion model coefficient vector sets according to the N pre-distortion output signals and the N digital intermediate frequency feedback signals.

With reference to the second aspect, in a first possible implementation manner, the step of generating N pre-distortion output signals according to N digital intermediate frequency signals of different bands, N pre-distortion model coefficient vector sets, and N preset digital frequency conversion coefficient vector sets includes:

generating N pre-distortion model vector sets $B_1, B_2, \ldots, B_S, \ldots$, and $B_N$ according to the N digital intermediate frequency signals, where $1 \leq S \leq N$, $B_S = (B_S^{(in)}, B_S^{(cross)}, B_S^{(out)_1}, B_S^{(out)_2}, \ldots, B_S^{(out)_P})$, $B_S^{(in)}$ is an in-band intermodulation distortion model vector in $B_S$, P is a quantity of out-of-band intermodulation distortion components corresponding to $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$;

acquiring the N pre-distortion model coefficient vector sets $\omega_1, \omega_2, \ldots, \omega_S, \ldots$, and $\omega_N$, where $\omega_S = (\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$;

generating the N preset digital frequency conversion coefficient vector sets $F_1, F_2, \ldots, F_S, \ldots$, and $F_N$, where $F_S = (F_S^{(in)}, F_S^{(cross)}, F_S^{(out)_1}, F_S^{(out)_2}, \ldots, F_S^{(out)_P})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(out)_P}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal; and generating the N pre-distortion output signals $y_1, y_2, \ldots, y_S, \ldots$, and $y_N$ according to the N pre-distortion model vector sets, the N pre-distortion model coefficient vector sets, and the N preset digital frequency conversion coefficient vector sets, where $y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}$.

With reference to the second aspect or the first possible implementation manner, in a second possible implementation manner, before the step of generating N pre-distortion output signals according to N digital intermediate frequency signals of different bands, N pre-distortion model coefficient vector sets, and N preset digital frequency conversion coefficient vector sets, the method further includes:

generating the N digital intermediate frequency signals according to N baseband signals of different bands.

With reference to the first possible implementation manner of the second aspect, in a third possible implementation manner, the step of generating N new pre-distortion model coefficient vector sets according to the N pre-distortion output signals and the N digital intermediate frequency feedback signals includes:

determining an $S^{th}$ pre-distortion model coefficient vector set in the N new pre-distortion model coefficient vector sets by using the following formulas:

$$\omega_S = (U_1^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

where Q is a quantity of sampling points of an $S^{th}$ digital intermediate frequency feedback signal, and $u_S$ is a pre-distortion learning vector set generated according to the $S^{th}$ digital intermediate frequency feedback signal and an $S^{th}$ digital frequency conversion coefficient vector set.

Implementation of the present disclosure brings the following beneficial effects:

A pre-distortion circuit acquires an in-band intermodulation distortion model coefficient vector, a cross-band modulation distortion model coefficient vector, and an out-of-band intermodulation distortion model coefficient vector that are learned by a learning circuit according to an output signal of a power amplifier, and performs pre-distortion processing on an input digital intermediate frequency signal, thereby eliminating out-of-band intermodulation distortion generated after the digital intermediate frequency signal passes through the power amplifier, and improving output linearity of the power amplifier.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, in-band intermodulation distortion of a band refers to distortion generated by intermodulation of signals in the band, and a location of a center frequency of in-band intermodulation distortion is the same as a location of a center frequency of the band; cross-band modulation distortion of a band refers to distortion generated by cross-modulation of a signal envelope in another band and a signal in the band, and a location of a center frequency of cross-band modulation distortion is the same as a location of a center frequency of the band; and out-of-band intermodulation distortion of a band refers to distortion generated by intermodulation of a signal in another band and a signal in the band, and a location of a center frequency of out-of-band intermodulation distortion is different from a location of a center frequency of the band.

Figure 1:
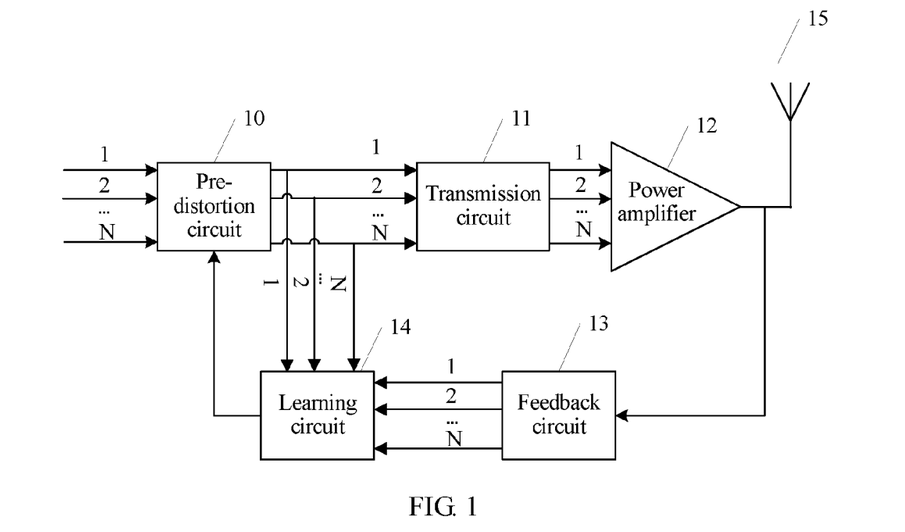
FIG. 1 is a schematic structural diagram of a pre-distortion system according to a first embodiment of the present invention.

Referring to FIG. 1, FIG. 1 is a schematic structural diagram of a pre-distortion system according to a first embodiment of the present invention. In this embodiment of the present invention, the pre-distortion system includes a pre-distortion circuit 10, a transmission circuit 11, a power amplifier 12, a feedback circuit 13, a learning circuit 14, and an antenna 15.

The pre-distortion circuit 10 is configured to generate N pre-distortion output signals according to N digital intermediate frequency signals of different bands, N pre-distortion model coefficient vector sets generated by the learning circuit 14, and N preset digital frequency conversion coefficient vector sets, where each pre-distortion model coefficient vector set includes one in-band intermodulation distortion model coefficient vector, one cross-band modulation distortion model coefficient vector, and at least one out-of-band intermodulation distortion model coefficient vector, and N is an integer greater than 2.

Specifically, pre-distortion processing performed by the pre-distortion circuit 10 on the input N digital intermediate frequency signals of different bands is specifically: generating a corresponding pre-distortion model vector by using each digital intermediate frequency signal, and then multiplying the pre-distortion model vector by a corresponding pre-distortion model coefficient vector generated by the learning circuit 14 and a corresponding digital frequency conversion coefficient vector, so as to obtain each pre-distortion output signal. Each pre-distortion model coefficient vector set includes one in-band intermodulation distortion model coefficient vector, one cross-band modulation distortion model coefficient vector, and at least one out-of-band intermodulation distortion model coefficient vector. A quantity of out-of-band intermodulation distortion model coefficient vectors is equal to a quantity of out-of-band intermodulation distortion components near a carrier frequency corresponding to the digital intermediate frequency signal. The quantity may be determined according to constraint conditions such as a carrier frequency, a quantity of carrier frequencies, a frequency spacing, and a signal order. For example, it is assumed that N=3, carrier frequencies corresponding to three digital intermediate frequency signals are 1900 MHz, 2350 MHz, and 2590 MHz respectively, and it is specified that out-of-band intermodulation distortion components whose signal order is less than 7 and whose frequency spacing from the carrier frequencies is less than 100 MHz are selected. Therefore, it is very easy to calculate and learn that a quantity of out-of-band intermodulation distortion components near the carrier frequency 1900 MHz is 3, and correspondingly, a quantity of out-of-band intermodulation distortion model coefficient vectors is also 3. Likewise, according to the same constraint condition described above, it is very easy to calculate and learn that a quantity of out-of-band intermodulation distortion components near the carrier frequency 2350 MHz and a quantity of out-of-band intermodulation distortion components near the carrier frequency 2590 MHz are also equal to 3.

The transmission circuit 11 is configured to generate a radio frequency analog signal according to the N pre-distortion output signals generated by the pre-distortion circuit.

Specifically, the transmission circuit 11 performs digital up-conversion processing on the N pre-distortion output signals that are input by the pre-distortion circuit 10, so as to improve a sampling rate of each pre-distortion output signal. Because no frequency conversion processing is performed in the pre-distortion circuit 10 on a digital intermediate frequency signal, the sampling rate of each generated pre-distortion output signal is equal to a sampling rate of a corresponding digital intermediate frequency signal. For example, it is assumed that the sampling rate of each pre-distortion output signal is 153.6 MHz. The sampling rate of each pre-distortion output signal is increased to 3.072 GHz after the digital up-conversion processing is performed. A process of digital up-conversion may be implemented by means of interpolation and filtering. If a processing capability of a device is limited, the interpolation and the filtering may be implemented at multiple levels. Certainly, the interpolation and the filtering may also be implemented at only one level, which is not limited by the present invention. It can be understood that, in a filtering processing step, a constraint condition that a passband of a filter needs to meet is: an out-of-band component generated by the pre-distortion circuit is reserved.

Then, the transmission circuit 11 modulates the N pre-distortion output signals, having undergone digital up-conversion, onto N corresponding carrier frequencies, where all carrier frequencies are different, and generates one radio frequency analog signal after performing combining and digital-to-analog conversion processing on the modulated N signals.

The power amplifier 12 is configured to perform amplification processing according to the radio frequency analog signal generated by the transmission circuit, so as to generate a radio frequency analog signal that has undergone the amplification processing.

Specifically, the power amplifier 12 divides the radio frequency analog signal that has undergone the amplification processing into two signals to perform transmission: one signal is transmitted by using the antenna 15, and the other signal is transmitted to the feedback circuit 13 by using a coupler.

The feedback circuit 13 is configured to generate N digital intermediate frequency feedback signals according to the radio frequency analog signal that is generated by the power amplifier and that has undergone the amplification processing.

Specifically, a processing procedure of the feedback circuit 13 may be deemed an inverse process of the transmission circuit 11. The feedback circuit 13 obtains N radio frequency analog signals of different bands after performing anti-aliasing filtering processing on the radio frequency analog signal, and then generates N digital signals after performing analog-to-digital conversion and demodulation processing on the obtained N radio frequency analog signals of different bands, and performs digital down-conversion processing on the N digital signals to generate N digital intermediate frequency feedback signals with a lower sampling rate. For example, it is assumed that a sampling rate of the N digital signals is 3.072 GHz. The sampling rate is 153.6 MHz after the digital down-conversion processing. A processing procedure of digital down-conversion may be implemented by means of extraction and filtering, which is not limited by the present invention. It should be noted that, in a filtering step, a constraint condition that needs to be set on a filter is: a nonlinear distortion component of the power amplifier 12 is reserved.

The learning circuit 14 is configured to generate N new pre-distortion model coefficient vector sets according to the N pre-distortion output signals generated by the pre-distortion circuit and the N digital intermediate frequency feedback signals generated by the feedback circuit.

Specifically, the learning circuit 14 first estimates delays, phases, and amplitudes of the digital intermediate frequency feedback signals and the pre-distortion output signals according to the digital intermediate frequency feedback signals input by the feedback circuit 13 and the pre-distortion output signals output by the pre-distortion circuit 10, and adjusts the digital intermediate frequency feedback signals, so that each digital intermediate frequency feedback signal in the N digital intermediate frequency feedback signals is aligned with each pre-distortion output signal in the N pre-distortion output signals. Then, the learning circuit 14 generates the N new pre-distortion model coefficient vector sets according to the N pre-distortion output signals input by the pre-distortion circuit 10 and the N digital intermediate frequency feedback signals input by the feedback circuit 13. A specific calculation method may be: performing a fitting operation on the N pre-distortion output signals and the N digital intermediate frequency feedback signals, so as to obtain a function relationship between each pre-distortion output signal and each digital intermediate frequency feedback signal. A specific algorithm for the fitting operation may be any known fitting algorithm in the prior art such as a least square method, which is not limited by the present invention. A method used by the learning circuit 14 to generate N pre-distortion model coefficient vector sets is the same as that described above, and details are not described herein again.

It may be understood that, in a non-ideal pre-distortion system, a specific time delay exists between input and output of the pre-distortion system. Therefore, when the pre-distortion circuit 10 generates the N pre-distortion output signals according to the N digital intermediate frequency signals of different bands, the N pre-distortion model coefficient vector sets, and the N preset digital frequency conversion coefficient vector sets, the pre-distortion model coefficient vector sets currently obtained from the learning circuit 14 are not generated according to current digital intermediate frequency signals by means of transmission, amplification, feedback, and learning. In this way, when performing pre-distortion processing initially, the pre-distortion circuit cannot acquire in real time the pre-distortion model coefficient vector sets generated by the learning circuit. Therefore, it is specified that when the pre-distortion circuit performs pre-distortion processing initially, the pre-distortion circuit uses a preset pre-distortion model coefficient vector set to generate a pre-distortion output signal.

Through implementation of the present disclosure, a pre-distortion circuit acquires an in-band intermodulation distortion model coefficient vector, a cross-band modulation distortion model coefficient vector, and an out-of-band intermodulation distortion model coefficient vector that are learned by a learning circuit according to an output signal of a power amplifier, and performs pre-distortion processing on an input digital intermediate frequency signal, thereby eliminating out-of-band intermodulation distortion generated after the digital intermediate frequency signal passes through the power amplifier, and improving output linearity of the power amplifier.

Figure 2:
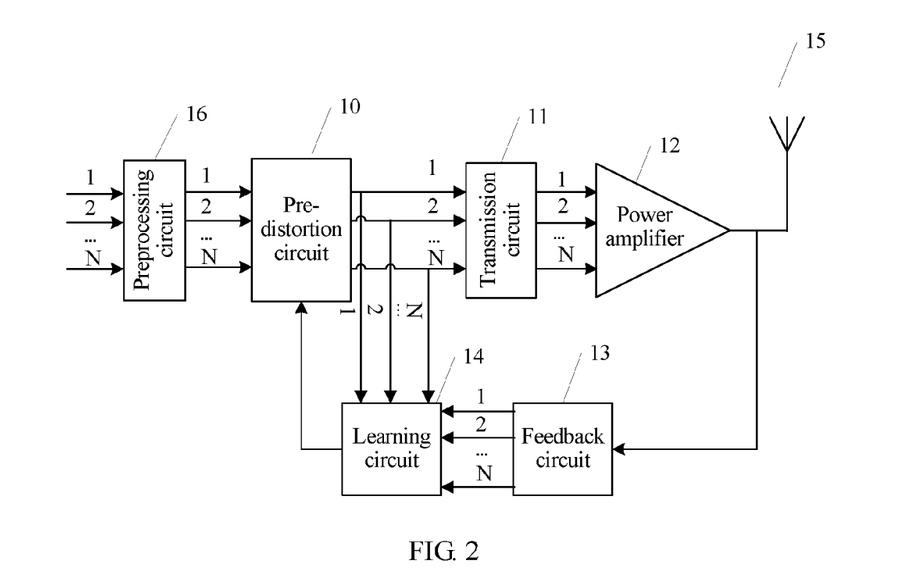
FIG. 2 is a schematic structural diagram of a pre-distortion system according to a second embodiment of the present invention.

Referring to FIG. 2, FIG. 2 is a schematic structural diagram of a pre-distortion system according to a second embodiment of the present invention. In this embodiment, the pre-distortion system includes a preprocessing circuit 16, a pre-distortion circuit 10, a transmission circuit 11, a power amplifier 12, a feedback circuit 13, a learning circuit 14, and an antenna 15.

The preprocessing circuit 16 is configured to perform digital up-conversion and clipping processing on N baseband signals of different bands to generate N digital intermediate frequency signals, and input the N digital intermediate frequency signals into the pre-distortion circuit.

Specifically, the preprocessing circuit 16 inputs the N digital intermediate frequency signals that are generated after performing the digital up-conversion processing and clipping processing on the N baseband signals of different bands, where the clipping processing can suppress a peak average power ratio (PAPR) of an input signal of the power amplifier. For example, it is assumed that the preprocessing circuit 16 inputs three baseband signals and a sampling rate of each baseband signal is 30.72 MHz. The preprocessing circuit 16 performs 5-times interpolation and filtering processing on each baseband signal, increases the sampling rate of each baseband signal to 153.6 MHz, and then performs clipping processing on the signal that has undergone the digital up-conversion processing.

Functions of the pre-distortion circuit 10 have been described in the embodiment corresponding to FIG. 1, and are not detailed herein again.

Figure 3:
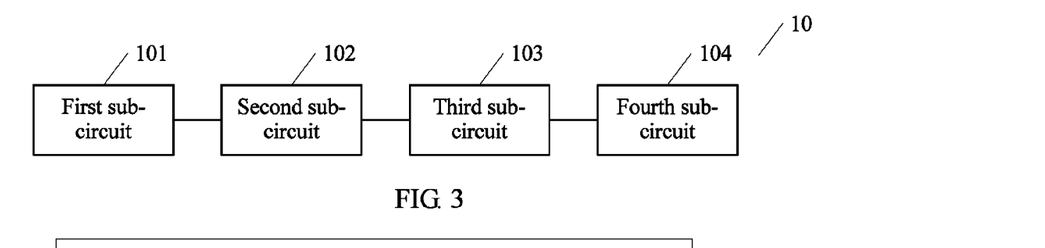
FIG. 3 is a schematic structural diagram of a pre-distortion circuit in FIG. 2.
Figure 4:
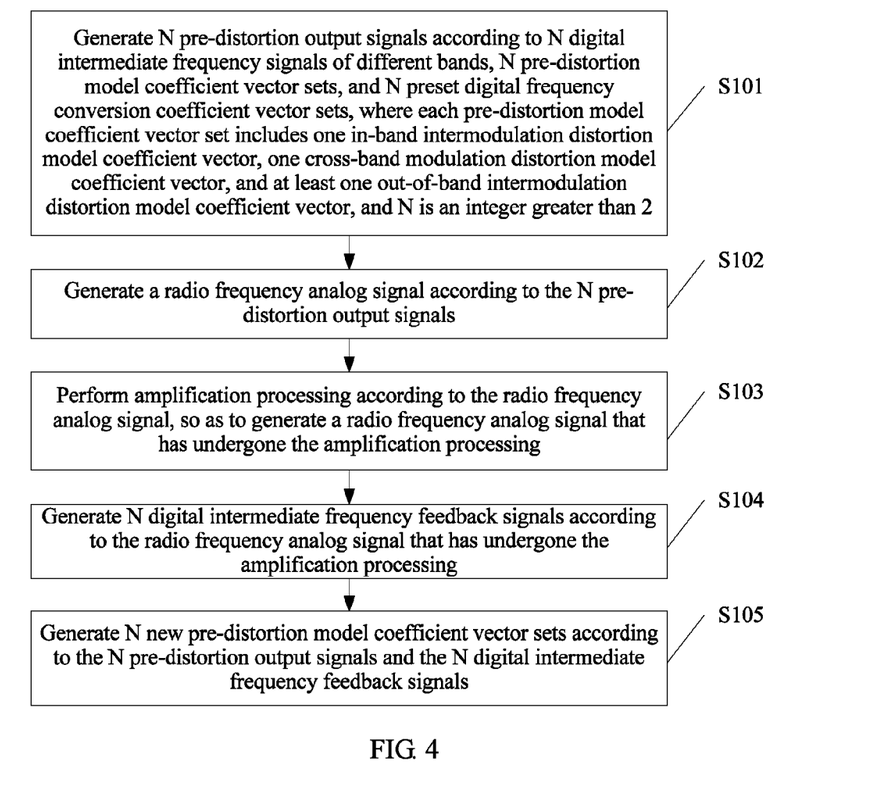
FIG. 4 is a schematic flowchart of a pre-distortion method according to an embodiment of the present invention.

The pre-distortion circuit 10 in this embodiment may further include a first sub-circuit 101, a second sub-circuit 102, a third sub-circuit 103, and a fourth sub-circuit 104.

The first sub-circuit 101 is configured to generate N pre-distortion model vector sets $B_1, B_2, \ldots, B_S, \ldots,$ and $B_N$ according to the N digital intermediate frequency signals, where $1 \leq S \leq N$, $B_S = (B_S^{(in)}, B_S^{(cross)}, B_S^{(out)_1}, B_S^{(out)_2}, \ldots, B_S^{(out)_P})$, P is a quantity of out-of-band intermodulation distortion components corresponding to $B_S$, $B_S^{(in)}$ is an in-band intermodulation distortion model vector in $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$.

The second sub-circuit 102 is configured to acquire N pre-distortion model coefficient vector sets $\omega_1, \omega_2, \ldots, \omega_S, \ldots,$ and $\omega_N$ generated by the learning circuit, where $\omega_S = (\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$.

The third sub-circuit 103 is configured to generate N preset digital frequency conversion coefficient vector sets $F_1, F_2, \ldots, F_S, \ldots,$ and $F_N$, where $F_S = (F_S^{(in)}, F_S^{(cross)}, F_S^{(out)_1}, F_S^{(out)_2}, \ldots, F_S^{(out)_P})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(cross)}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal.

The fourth sub-circuit 104 is configured to generate N pre-distortion output signals $y_1, y_2, \ldots, y_S, \ldots,$ and $y_N$ according to the N pre-distortion model vector sets, the N pre-distortion model coefficient vector sets, and the N preset digital frequency conversion coefficient vector sets, where
$y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}$.

Figure 5:
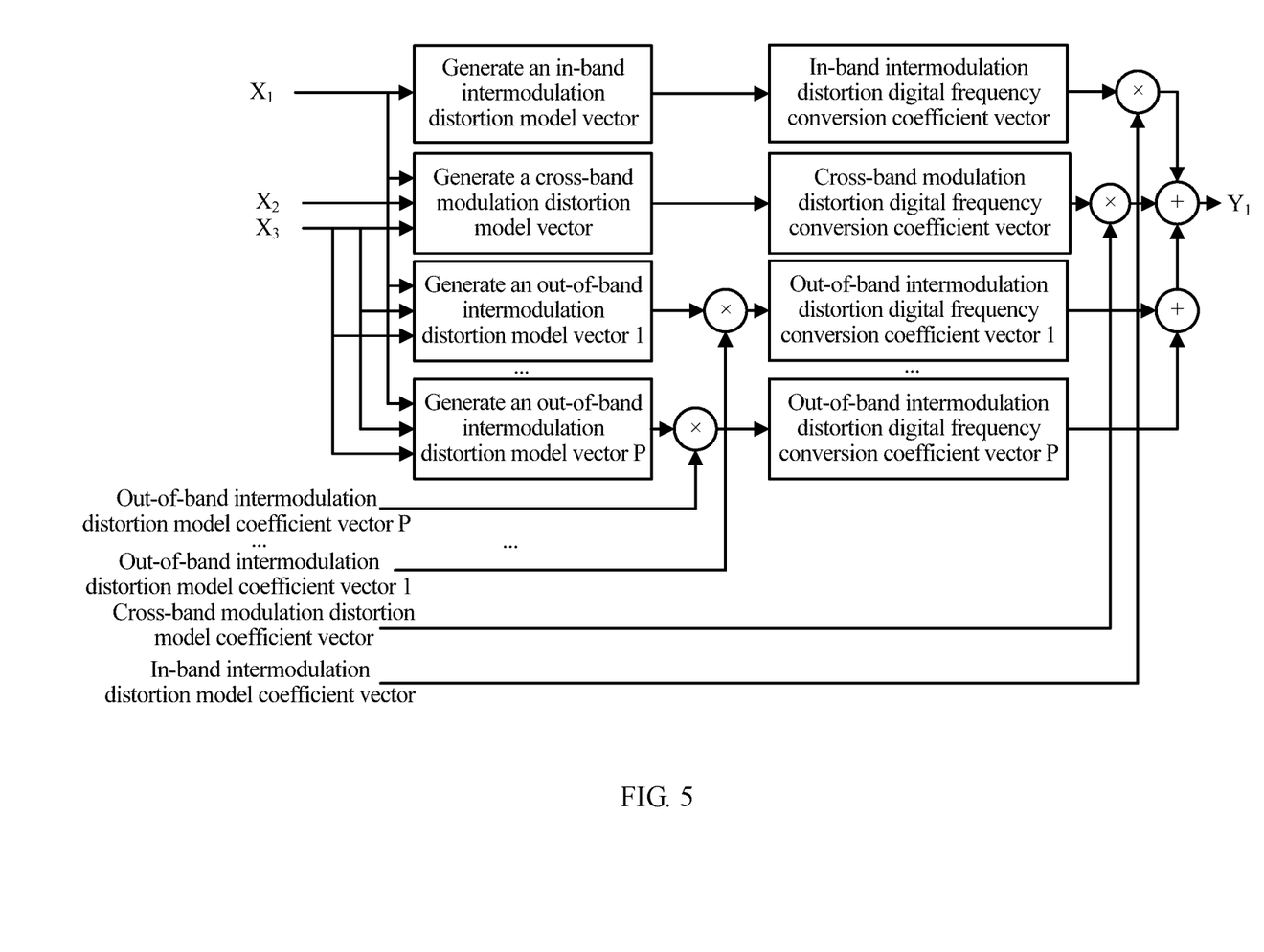
FIG. 5 is a schematic diagram of an operation of a pre-distortion output signal in FIG. 4.

As shown in FIG. 5, the following describes the foregoing processing method by using specific parameters. It is assumed that N=3, S=1, and P=3, where a carrier frequency of a $1^{st}$ digital intermediate frequency signal $x_1$ is 1900 MHz, a carrier frequency of a $2^{nd}$ digital intermediate frequency signal $x_2$ is 2350 MHz, and a carrier frequency of a $3^{rd}$ digital intermediate frequency signal $x_3$ is 2590 MHz. An out-of-band intermodulation distortion component of an order higher than 7 is ignored. Center frequencies of out-of-band intermodulation distortion components shown in Table 1 are calculated according to the foregoing three carrier frequencies. For example, −3*1900 MHz+1*2350 MHz+2*2590 MHz=1830 MHz, indicating that an out-of-band intermodulation band with a center frequency of 1830 is generated by modulating the three carrier frequencies, where a nonlinear order is 6.

TABLE 1

| Carrier frequency (MHz) | Center frequency of out-of-band intermodulation distortion component (MHz) | | |
|---|---|---|---|
| | 1 | 2 | 3 |
| Digital intermediate frequency signal 1 | 1900 | 1830 | 1870 | 1930 |
| Digital intermediate frequency signal 2 | 2350 | 2320 | 2380 | 2420 |
| Digital intermediate frequency signal 3 | 2590 | 2560 | 2620 | 2660 |

Generally, an example in which a pre-distortion output signal of the digital intermediate frequency signal 1 is generated is used as an example for description. Multiplying an in-band intermodulation distortion model vector by a corresponding in-band intermodulation distortion model coefficient vector and a corresponding digital frequency conversion coefficient vector may be specifically represented by the following formula:

$$y_1^{(in)}(n) = B_1^{(in)} \cdot \omega_1^{(in)} \cdot F_1^{(in)} = \sum_{m=0}^{M}\sum_{k=1}^{K} a_{m,k}^{(1,in)} x_1(n-m)|x_1(n-m)|^{k-1},$$

where elements in a digital frequency conversion coefficient vector corresponding to the digital intermediate frequency signal 1 are all 1, $x_1$ represents the digital intermediate frequency signal 1, $a_{m,k}^{(1,in)}$ represents the in-band intermodulation pre-distortion model coefficient vector corresponding to the digital intermediate frequency signal 1, M represents a memory depth, and K represents a nonlinear order.

Multiplying a cross-band modulation distortion model vector by a corresponding cross-band modulation distortion model coefficient vector and a corresponding digital frequency conversion coefficient vector may be specifically represented by the following formula:

$$y_1^{(cross)}(n) = \sum_{m=0}^{M}\sum_{k=1}^{K-1}\sum_{l=1}^{k}\sum_{j=0}^{l} a_{m,k,l,j}^{(1,cross)} x_1(n-m)|x_1(n-m)|^{k-l}|x_2(n-m)|^{l-j}|x_3(n-m)|^{j},$$

where $x_2$ and $x_3$ represent a digital intermediate frequency signal 2 and a digital intermediate frequency signal 3 respectively, elements in the cross-band modulation digital frequency conversion vector are all 1, $a_{m,k,l,j}^{(1,cross)}$ represents a cross-band modulation distortion model coefficient vector corresponding to the digital intermediate frequency signal 1, and M and K represent a memory depth and a nonlinear order respectively.

An out-of-band intermodulation distortion model vector 1 is multiplied by a corresponding digital frequency conversion coefficient vector 1 and a corresponding out-of-band intermodulation distortion model coefficient vector 1, which may be specifically represented by the following formula:

$$y_1^{(out)_1}(n) = B_S^{(out)_1} \cdot \omega_S^{(out)_1} \cdot F_S^{(out)_1} = \sum_{m=0}^{M} a_m^{(1,out1)} x_1^2(n-m)(x_2^*(n-m))^3 x_3^2(n-m) e^{j2\pi n f_1^{(out)_1}/f_{sample}},$$

where $a_m^{(1,out1)}$ represents an out-of-band intermodulation distortion model coefficient vector corresponding to an out-of-band intermodulation distortion component 1, a carrier frequency is 1900 MHz, a center frequency of the intermodulation distortion component 1 near the carrier frequency is 1930 MHz, $f_1^{(out1)}=1930-1900=30$ MHZ represents a difference between the carrier frequency of the digital intermediate frequency signal 1 and the center frequency of the out-of-band intermodulation distortion component, and $f_s=153.6$ MHZ represents a sampling rate of the digital intermediate frequency signal 1.

Likewise, pre-distortion cancellation may be performed on other out-of-band intermodulation distortion components (out-of-band intermodulation distortion components with center frequencies of 1830 MHz and 1870 MHz) around the carrier frequency of the digital intermediate frequency signal 1 to obtain $y_1^{(out2)}(n)$ K $y_1^{(outK)}(n)$ and generate a pre-distortion output signal of the digital intermediate frequency signal 1, which is represented by $y_1(n)=y_1^{(in)}(n)+y_1^{(cross)}(n)+y_1^{(out)_1}(n)+L+y_1^{(out)_P}(n)$.

The pre-distortion processing on the digital intermediate frequency signal 2 and the digital intermediate frequency signal 3 may be performed by using a method that is the same as that described above, to generate pre-distortion output signals $y_2(n)$ and $y_3(n)$ corresponding to the digital intermediate frequency signal 2 and the digital intermediate frequency signal 3, respectively.

The transmission circuit 11 is configured to generate a radio frequency analog signal according to the N pre-distortion output signals generated by the pre-distortion circuit.

Specifically, in an example in which the transmission circuit 11 performs processing on three pre-distortion output signals, digital up-conversion processing is separately performed on the three pre-distortion output signals to improve their sampling rate. Specifically, interpolation and filtering are separately performed to increase the sampling rate to 3.072 GHz. A process of performing the interpolation and filtering on the pre-distortion output signal may be implemented at multiple levels. In addition, a condition that needs to be met by a passband setting of a filter in the filtering step is: an out-of-band component generated by the pre-distortion circuit is reserved. Then the three pre-distortion output signals, having undergone the digital up-conversion processing, are modulated onto carriers whose frequencies are 1900 MHz, 2350 MHz, and 2590 MHz respectively, the modulated signals are combined into one digital signal, and then the digital signal is converted into a radio frequency analog signal, and the radio frequency analog signal is transmitted by using the power amplifier.

The power amplifier 12 is configured to perform amplification processing according to the radio frequency analog signal generated by the transmission circuit, so as to generate a radio frequency analog signal that has undergone the amplification processing.

Specifically, the power amplifier 12 divides the radio frequency analog signal that has undergone the amplification processing into two signals to perform transmission: one signal is transmitted by using the antenna 15, and the other signal is transmitted to the feedback circuit 13 by using a coupler.

The feedback circuit 13 is configured to generate N digital intermediate frequency feedback signals according to the radio frequency analog signal that is generated by the power amplifier and that has undergone the amplification processing.

Specifically, filtering, demodulation, analog-to-digital conversion, and digital down-conversion are performed on the radio frequency analog signal that has undergone amplification processing and that is output by the power amplifier 12, so as to generate the N digital intermediate frequency feedback signals.

For example, the feedback circuit obtains three analog signals after performing anti-aliasing filtering and demodulation processing on the radio frequency analog signal that has undergone amplification processing, the three analog signals are converted into three digital signals by using an analog-to-digital converter, and digital down-conversion (extraction and filtering) is separately performed on the three digital signals output by the analog-to-digital converter. A sampling rate changes to 153.6 MHz, and three digital intermediate frequency feedback signals are obtained, where each digital intermediate frequency feedback signal is a digital intermediate frequency signal. It may be understood that a nonlinear distortion component generated by the power amplifier 12 needs to be reserved when the extraction and filtering are performed.

The learning circuit 14 is configured to generate N new pre-distortion model coefficient vector sets according to the N pre-distortion output signals generated by the pre-distortion circuit and the N digital intermediate frequency feedback signals generated by the feedback circuit.

Specifically, the learning circuit 14 performs learning according to the N digital intermediate frequency feedback signals input by the feedback circuit 13 and the N pre-distortion output signals input by the pre-distortion circuit 10, so as to obtain corresponding new pre-distortion model coefficient vector sets.

It is assumed that N=3. The learning circuit 14 first uses the three digital intermediate frequency feedback signals and the three pre-distortion output signals to separately estimate delay, phase, and amplitude differences between the three pre-distortion output signals and the three digital intermediate frequency feedback signals, and adjusts delays, phases, and amplitudes of the digital intermediate frequency feedback signals, so that each digital intermediate frequency feedback signal is aligned with each pre-distortion output signal.

Figure 6:
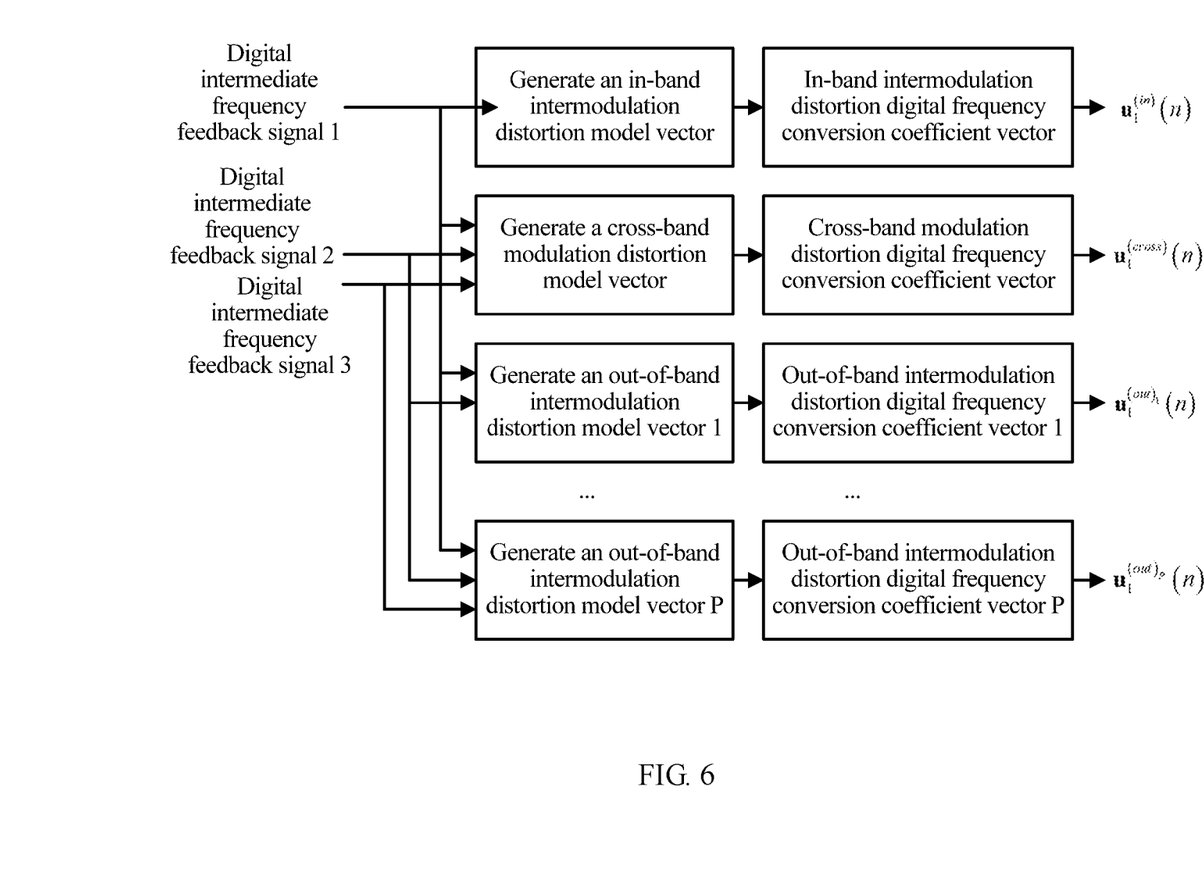
FIG. 6 is a schematic diagram of an operation of a pre-distortion learning vector set in FIG. 4.

Referring to FIG. 6, an example in which the learning circuit 14 generates a pre-distortion model coefficient vector set of a $1^{st}$ digital intermediate frequency signal is used. Note that a processing procedure in FIG. 6 is basically consistent with a processing method in the pre-distortion circuit 10; a difference lies in that a pre-distortion learning vector is generated in FIG. 7 and is not multiplied by a pre-distortion coefficient vector set, where the pre-distortion learning vector set is represented by $u_1(n)=[u_1^{in}(n), u_1^{cross}(n), u_1^{(out)_1}, \ldots, u_1^{(out)_P}]$.

Pre-distortion learning vectors of Q sampling points are used, pre-distortion circuit output signals of the Q sampling points are used as reference signals, and a pre-distortion coefficient of the $1^{st}$ digital intermediate frequency signal is calculated by using an LS least square method, which may be represented by $$\omega_1 = (U_1^H U_1)^{-1} U_1^H Y_1$$

$$Y_1 = [y_1(n-Q+1), y_1(n-Q+2), \ldots, y_1(n)]^T$$

$$U_1 = \begin{bmatrix} u_1(n-Q+1) \\ u_1(n-Q+2) \\ \ldots \\ u_1(n) \end{bmatrix}.$$

The pre-distortion model coefficient vector of the $1^{st}$ digital intermediate frequency signal is transmitted to the pre-distortion circuit 10, so that the pre-distortion circuit 10 performs pre-distortion processing on the input $1^{st}$ digital intermediate frequency signal. Likewise, pre-distortion model coefficient vectors of a $2^{nd}$ digital intermediate frequency signal and a $3^{rd}$ digital intermediate frequency signal may be obtained by using a method that is the same as that described above.

Through implementation of the present disclosure, a pre-distortion circuit acquires an in-band intermodulation distortion model coefficient vector, a cross-band modulation distortion model coefficient vector, and an out-of-band intermodulation distortion model coefficient vector that are learned by a learning circuit according to an output signal of a power amplifier, and performs pre-distortion processing on an input digital intermediate frequency signal, thereby eliminating out-of-band intermodulation distortion generated after the digital intermediate frequency signal passes through the power amplifier, and improving output linearity of the power amplifier.

Referring to FIG. 3, FIG. 3 is a schematic flowchart of a pre-distortion method according to an embodiment of the present invention. In this embodiment, the pre-distortion method includes:

S101. Generate N pre-distortion output signals according to N digital intermediate frequency signals of different bands, N pre-distortion model coefficient vector sets, and N preset digital frequency conversion coefficient vector sets, where each pre-distortion model coefficient vector set includes one in-band intermodulation distortion model coefficient vector, one cross-band modulation distortion model coefficient vector, and at least one out-of-band intermodulation distortion model coefficient vector, and N is an integer greater than 2.

Specifically, pre-distortion processing performed on the input N digital intermediate frequency signals of different bands in S101 is specifically: generating a corresponding pre-distortion model vector by using each digital intermediate frequency signal, and then separately multiplying the pre-distortion model vector by a corresponding pre-distortion model coefficient vector and a corresponding digital frequency conversion coefficient vector, so as to obtain each pre-distortion output signal. A band of each digital intermediate frequency signal does not overlap that of another digital intermediate frequency signal. Each pre-distortion model coefficient vector set includes one in-band intermodulation distortion model coefficient vector, one cross-band modulation distortion model coefficient vector, and at least one out-of-band intermodulation distortion model coefficient vector. A quantity of out-of-band intermodulation distortion model coefficient vectors is equal to a quantity of out-of-band intermodulation distortion components near a carrier frequency corresponding to the digital intermediate frequency signal. The quantity may be determined according to constraint conditions such as a carrier frequency, a quantity of carrier frequencies, a frequency spacing, and a signal order. For example, it is assumed that N=3, carrier frequencies corresponding to three digital intermediate frequency signals are 1900 MHz, 2350 MHz, and 2590 MHz respectively, and it is specified that out-of-band intermodulation distortion components whose signal order is less than 7 and whose frequency spacing from the carrier frequencies is less than 100 MHz are selected. Therefore, it is very easy to calculate and learn that a quantity of out-of-band intermodulation distortion components near the carrier frequency 1900 MHz is 3, and correspondingly, a quantity of out-of-band intermodulation distortion model coefficient vectors is also 3. Likewise, according to the same constraint condition described above, it is very easy to calculate and learn that a quantity of out-of-band intermodulation distortion components near the carrier frequency 2350 MHz and a quantity of out-of-band intermodulation distortion components near the carrier frequency 2590 MHz are also equal to 3.

Further, optionally, S101 specifically includes:

S1011. Generate N pre-distortion model vector sets $B_1$, $B_2, \ldots, B_S, \ldots$, and $B_N$ according to the N digital intermediate frequency signals, where $1 \leq S \leq N$, $B_S=(B_S^{(in)}, B_S^{(cross)}, B_S^{(out)_1}, B_S^{(out)_2}, \ldots, B_S^{(out)_P})$, P is a quantity of out-of-band intermodulation distortion components corresponding to $B_S$, $B_S^{(in)}$ is an in-band intermodulation distortion model vector in $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$.

S1012. Acquire the N pre-distortion model coefficient vector sets $\omega_1, \omega_2, \ldots, \omega_S, \ldots,$ and $\omega_N$, where $\omega_S=(\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$.

S1013. Generate the N preset digital frequency conversion coefficient vector sets $F_1, F_2, \ldots, F_S, \ldots,$ and $F_N$, where $F_S=(F_S^{(in)}, F_S^{(cross)}, F_S^{(out)_1}, F_S^{(out)_2}, \ldots, F_S^{(out)_P})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(cross)}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal.

S1014. Generate the N pre-distortion output signals $y_1, y_2, \ldots, y_S, \ldots,$ and $y_N$ according to the N pre-distortion model vector sets, the N pre-distortion model coefficient vector sets, and the N preset digital frequency conversion coefficient vector sets, where $y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}$.

As shown in FIG. 5, the following describes the foregoing processing method by using specific parameters. It is assumed that N=3, S=1, and P=3, where a carrier frequency of a $1^{st}$ digital intermediate frequency signal $x_1$ is 1900 MHz, a carrier frequency of a $2^{nd}$ digital intermediate frequency signal $x_2$ is 2350 MHz, and a carrier frequency of a $3^{rd}$ digital intermediate frequency signal $x_3$ is 2590 MHz. An out-of-band intermodulation distortion component of an order higher than 7 is ignored. Center frequencies of out-of-band intermodulation distortion components shown in Table 2 are calculated according to the foregoing three carrier frequencies. For example, −3*1900 MHz+1*2350 MHz+2*2590 MHz=1830 MHz, indicating that an out-of-band intermodulation band with a center frequency of 1830 is generated by modulating the three carrier frequencies, where a nonlinear order is 6.

TABLE 2

| Carrier frequency (MHz) | Center frequency of out-of-band intermodulation distortion component (MHz) | | |
|---|---|---|---|
| | 1 | 2 | 3 |
| Digital intermediate frequency signal 1 | 1900 | 1830 | 1870 | 1930 |
| Digital intermediate | 2350 | 2320 | 2380 | 2420 |

TABLE 2-continued

| Carrier frequency (MHz) | Center frequency of out-of-band intermodulation distortion component (MHz) | | |
|---|---|---|---|
| | 1 | 2 | 3 |
| frequency signal 2 | | | | |
| Digital intermediate frequency signal 3 | 2590 | 2560 | 2620 | 2660 |

Generally, an example in which a pre-distortion output signal of the digital intermediate frequency signal 1 is generated is used as an example for description. Multiplying an in-band intermodulation distortion model vector by a corresponding in-band intermodulation distortion model coefficient vector and a corresponding digital frequency conversion coefficient vector may be specifically represented by the following formula:

$$y_1^{(in)}(n) = B_1^{(in)} \cdot \omega_1^{(in)} \cdot F_1^{(in)} = \sum_{m=0}^{M} \sum_{k=1}^{K} a_{m,k}^{(1,in)} x_1(n-m)|x_1(n-m)|^{k-1},$$

where elements in a digital frequency conversion coefficient vector corresponding to the digital intermediate frequency signal 1 are all 1, $x_1$ represents the digital intermediate frequency signal 1, $a_{m,k}^{(1,in)}$ represents the in-band intermodulation pre-distortion model coefficient vector corresponding to the digital intermediate frequency signal 1, M represents a memory depth, and K represents a nonlinear order.

Multiplying a cross-band modulation distortion model vector by a corresponding cross-band modulation distortion model coefficient vector and a corresponding digital frequency conversion coefficient vector may be specifically represented by the following formula:

$$y_1^{(cross)}(n) = \sum_{m=0}^{M} \sum_{k=1}^{K-1} \sum_{l=1}^{k} \sum_{j=0}^{l} a_{m,k,l,j}^{(1,cross)} x_1(n-m)|x_1(n-m)|^{k-l}|x_2(n-m)|^{l-j}|x_3(n-m)|^{j},$$

where $x_2$ and $x_3$ represent a digital intermediate frequency signal 2 and a digital intermediate frequency signal 3 respectively, elements in the cross-band modulation digital frequency conversion vector are all 1, $a_{m,k,l,j}^{(1,cross)}$ represents a cross-band modulation distortion model coefficient vector corresponding to the digital intermediate frequency signal 1, and M and K represent a memory depth and a nonlinear order respectively.

An out-of-band intermodulation distortion model vector 1 is multiplied by a corresponding digital frequency conversion coefficient vector 1 and a corresponding out-of-band intermodulation distortion model coefficient vector 1, which may be specifically represented by the following formula:

$$y_1^{(out)_1}(n) = B_S^{(out)_1} \cdot \omega_S^{(out)_1} \cdot F_S^{(out)_1} =$$

$$\sum_{m=0}^{M} a_m^{(1,out_1)} x_1^2(n-m)(x_2^*(n-m))^3 x_3^2(n-m) e^{j2\pi n f_1^{(out)_1} 1/f_{sample}},$$

where $a_m^{(1,out_1)}$ represents an out-of-band intermodulation distortion model coefficient vector corresponding to an out-of-band intermodulation distortion component 1, a carrier frequency is 1900 MHz, a center frequency of the out-of-band intermodulation distortion component 1 near the carrier frequency is 1930 MHz, $f_1^{(out_1)}=1930-1900=30$ MHZ represents a difference between the carrier frequency of the digital intermediate frequency signal 1 and the center frequency of the out-of-band intermodulation distortion component, and $f_s=153.6$ MHZ represents a sampling rate of the digital intermediate frequency signal 1.

Likewise, pre-distortion cancellation may be performed on other out-of-band intermodulation distortion components (out-of-band intermodulation distortion components with center frequencies of 1830 MHz and 1870 MHz) around the carrier frequency of the digital intermediate frequency signal 1 to obtain $y_1^{(out_2)}(n)$ K $y_1^{(outK)}(n)$ and generate a pre-distortion output signal of the digital intermediate frequency signal 1, which is represented by $y_1(n)=y_1^{(in)}(n)+y_1^{(cross)}(n)+y_1^{(out)_1}(n)+L+y_1^{(out)_P}(n)$.

The pre-distortion processing on the digital intermediate frequency signal 2 and the digital intermediate frequency signal 3 may be performed by using a method that is the same as that described above, to generate pre-distortion output signals $y_2(n)$ and $y_3(n)$ corresponding to the digital intermediate frequency signal 2 and the digital intermediate frequency signal 3, respectively.

S102. Generate a radio frequency analog signal according to the N pre-distortion output signals.

Specifically, in an example in which processing is performed on three pre-distortion output signals in S102, digital up-conversion processing is separately performed on the three pre-distortion output signals to improve their sampling rate. Specifically, interpolation and filtering are separately performed to increase the sampling rate to 3.072 GHz. A process of performing the interpolation and filtering on the pre-distortion output signal may be implemented at multiple levels. In addition, a condition that needs to be met by a passband setting of a filter in the filtering step is: an out-of-band component generated by the pre-distortion circuit is reserved. Then the three pre-distortion output signals, having undergone the digital up-conversion processing, are modulated onto carriers whose frequencies are 1900 MHz, 2350 MHz, and 2590 MHz respectively, the modulated signals are combined into one digital signal, and then the digital signal is converted into a radio frequency analog signal, and the radio frequency analog signal is transmitted by using the power amplifier.

S103. Perform amplification processing according to the radio frequency analog signal, so as to generate a radio frequency analog signal that has undergone the amplification processing.

Specifically, the radio frequency analog signal that has undergone the amplification processing is divided into two signals to be transmitted: one signal is transmitted by using the antenna, and the other signal is processed by a coupler in S104.

S104. Generate N digital intermediate frequency feedback signals according to the radio frequency analog signal that has undergone the amplification processing.

Specifically, filtering, analog-to-digital conversion, demodulation, and digital down-conversion are performed on the radio frequency analog signal that has undergone amplification processing and that is output in S103, so as to generate the N digital intermediate frequency feedback signals.

For example, three analog signals are obtained after anti-aliasing filtering and demodulation processing are performed on the radio frequency analog signal that has undergone amplification processing, the three analog signals are converted into three digital signals by using an analog-to-digital converter, and digital down-conversion (extraction and filtering) is separately performed on the three digital signals output by the analog-to-digital converter. A sampling rate changes to 153.6 MHz, and three digital intermediate frequency feedback signals are obtained, where each digital intermediate frequency feedback signal is a digital intermediate frequency signal. It may be understood that a nonlinear distortion component generated by the power amplifier needs to be reserved when the extraction and filtering are performed.

S105. Generate N new pre-distortion model coefficient vector sets according to the N pre-distortion output signals and the N digital intermediate frequency feedback signals.

Specifically, delays, phases, and amplitudes of the digital intermediate frequency feedback signals and the pre-distortion output signals are first estimated according to the digital intermediate frequency feedback signals obtained after processing is performed in S104 and the pre-distortion output signals obtained after processing is performed in S101, and the digital intermediate frequency feedback signals are adjusted, so that all digital intermediate frequency feedback signals in the N digital intermediate frequency feedback signals keep synchronized and that all pre-distortion output signals in the N pre-distortion output signals keep synchronized. Then, the N current pre-distortion model coefficient vector sets are calculated by using a preset algorithm and according to the N pre-distortion output signals obtained after processing is performed in S101 and the N digital intermediate frequency feedback signals obtained after processing is performed in S104. A specific calculation method may be: performing a fitting operation on the N pre-distortion output signals and the N digital intermediate frequency feedback signals, so as to obtain a function relationship between each pre-distortion output signal and each digital intermediate frequency feedback signal. A specific algorithm for the fitting operation may be any known fitting algorithm in the prior art such as a least square method, which is not limited by the present invention.

Optionally, the following formulas are used to determine an $S^{th}$ pre-distortion model coefficient vector set in the N new pre-distortion model coefficient vector sets:

$$\omega_S = (U_1^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

where Q is a quantity of sampling points of an $S^{th}$ digital intermediate frequency feedback signal, and $u_S$ is a pre-distortion learning vector set generated according to the $S^{th}$ digital intermediate frequency feedback signal and an $S^{th}$ digital frequency conversion coefficient vector set.

It may be understood that, in a non-ideal pre-distortion system, a specific time delay exists between input and output of the pre-distortion system. Therefore, when the N pre-distortion output signals are generated in S101 according to the N digital intermediate frequency signals of different bands, the N pre-distortion model coefficient vector sets, and the N preset digital frequency conversion coefficient vector sets, the pre-distortion model coefficient vector sets currently obtained from S105 are not generated according to current digital intermediate frequency signals by means of transmission, amplification, feedback, and learning. In this way, when pre-distortion processing is performed initially in S101, the pre-distortion model coefficient vector sets generated in S105 cannot be acquired in real time. Therefore, it is specified that when pre-distortion processing is performed initially in S101, a preset pre-distortion model coefficient vector set is used in S101 to generate a pre-distortion output signal.

Optionally, before S101, the method further includes: generating the N digital intermediate frequency signals according to N baseband signals of different bands.

Specifically, the N digital intermediate frequency signals are generated after digital up-conversion processing and clipping processing are performed on the N baseband signals of different bands, where the clipping processing can suppress a peak average power ratio (PAPR) of an input signal of the power amplifier. For example, it is assumed that three baseband signals are input and a sampling rate of each baseband signal is 30.72 MHz. A preprocessing circuit 16 performs 5-times interpolation and filtering processing on each baseband signal, increases the sampling rate of each baseband signal to 153.6 MHz, and then performs clipping processing on the signal that has undergone the digital up-conversion processing.

Through implementation of the present disclosure, a pre-distortion circuit acquires an in-band intermodulation distortion model coefficient vector, a cross-band modulation distortion model coefficient vector, and an out-of-band intermodulation distortion model coefficient vector that are learned by a learning circuit according to an output signal of a power amplifier, and performs pre-distortion processing on an input digital intermediate frequency signal, thereby eliminating out-of-band intermodulation distortion generated after the digital intermediate frequency signal passes through the power amplifier, and improving output linearity of the power amplifier.

Figure 7:
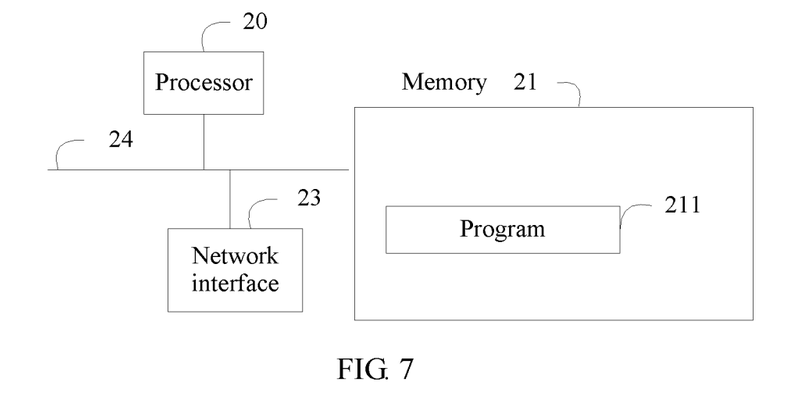
FIG. 7 is a schematic structural diagram of a pre-distortion system according to a third embodiment of the present invention.

FIG. 7 describes a structure of a pre-distortion system according to another embodiment of the present invention. The pre-distortion system includes at least one processor 20 (for example, a central processing unit (CPU)), at least one network interface 23 or another communications interface, a memory 21, and at least one communications bus 24 configured to implement connection and communication between the apparatuses. The processor 20 is configured to execute an executable module stored in the memory 21, such as a computer program. The memory 21 may include a high-speed random access memory (RAM), or may further include a non-volatile memory such as at least one magnetic disk memory. Communications connection between the pre-distortion system and at least one communications unit is implemented by using the at least one network interface 23 (which may be wired or wireless), for example, by the Internet, a wide area network, a local area network, or a metropolitan area network. The pre-distortion method in the embodiments of the present invention is applicable to a scenario in which radio frequency amplification is performed, for example, a radio frequency amplification process of a transmitter in a communications device such as a base station, a remote radio unit (RRU), or a mobile station. Correspondingly, the pre-distortion system may be a base station, a remote radio unit, a mobile station, or the like, which is not limited by the present invention.

In some implementation manners, the memory 21 stores a program 211, and the program 211 can be executed by the processor 20. The program includes:

generating N pre-distortion output signals according to N digital intermediate frequency signals of different bands, N pre-distortion model coefficient vector sets, and N preset digital frequency conversion coefficient vector sets, where each pre-distortion model coefficient vector set includes one in-band intermodulation distortion model coefficient vector, one cross-band modulation distortion model coefficient vector, and at least one out-of-band intermodulation distortion model coefficient vector, and N is an integer greater than 2;

generating a radio frequency analog signal according to the N pre-distortion output signals;

performing amplification processing according to the radio frequency analog signal, so as to generate a radio frequency analog signal that has undergone the amplification processing;

generating N digital intermediate frequency feedback signals according to the radio frequency analog signal that has undergone the amplification processing; and generating N new pre-distortion model coefficient vector sets according to the N pre-distortion output signals and the N digital intermediate frequency feedback signals.

Further, in this embodiment of the present invention, the step, performed by the processor 20, of generating N pre-distortion output signals according to N digital intermediate frequency signals of different bands, N pre-distortion model coefficient vector sets, and N preset digital frequency conversion coefficient vector sets includes:

generating N pre-distortion model vector sets $B_1$, $B_2, \ldots, B_S, \ldots$, and $B_N$ according to the N intermediate frequency signals, where $1 \leq S \leq N$, $B_S=(B_S^{(in)}, B_S^{(cross)}, B_S^{(out)_1}, B_S^{(out)_2}, \ldots, B_S^{(out)_P})$, $B_S^{(in)}$ is an in-band intermodulation distortion model vector in $B_S$, P is a quantity of out-of-band intermodulation distortion components corresponding to $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$;

acquiring the N pre-distortion model coefficient vector sets $\omega_1, \omega_2, \ldots, \omega_S, \ldots$, and $\omega_N$, where $\omega_S=(\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$;

generating the N preset digital frequency conversion coefficient vector sets $F_1, F_2, \ldots, F_S, \ldots$, and $F_N$, where $F_S=(F_S^{(in)}, F_S^{(cross)}, F_S^{(out)_1}, F_S^{(out)_2}, \ldots, F_S^{(out)_P})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)p}$ is an out-of-band intermodulation distortion digital frequency conversion coefficient vector of a $P^{th}$ out-of-band intermodulation distortion component in $F_S$, a quantity of elements in $F_S^{(out)p}$ is equal to a quantity of elements in $B_S^{(out)p}$ and equal to a quantity of elements in $\omega_S^{(out)p}$, and the elements in $F_S^{(cross)}$ are all $e^{j2\pi n f_S^{(out)p}/f_{sample}}$; $f_S^{(out)p}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal; and generating the N pre-distortion output signals $y_1$, $y_2, \ldots, y_S, \ldots$, and $y_N$ according to the N pre-distortion model vector sets, the N pre-distortion model coefficient vector sets, and the N preset digital frequency conversion coefficient vector sets, where $y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)p} \cdot \omega_S^{(out)p} \cdot F_S^{(out)p}$.

Further, the processor 20 is further configured to:

generate the N digital intermediate frequency signals according to N baseband signals of different bands.

Further, the step, performed by the processor 20, of generating N new pre-distortion model coefficient vector sets according to the N pre-distortion output signals and the N digital intermediate frequency feedback signals includes:

determining an $S^{th}$ pre-distortion model coefficient vector set in the N new pre-distortion model coefficient vector sets by using the following formulas:

$$\omega_S = (U_1^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

where Q is a quantity of sampling points of an $S^{th}$ digital intermediate frequency feedback signal, and $u_S$ is a pre-distortion learning vector set generated according to the $S^{th}$ digital intermediate frequency feedback signal and an $S^{th}$ digital frequency conversion coefficient vector set.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention. Additionally, statements made herein characterizing the invention refer to an embodiment of the invention and not necessarily all embodiments.

What is claimed is:

1. A pre-distortion system, comprising:
   a pre-distortion circuit, configured to generate N pre-distortion output signals according to N digital intermediate frequency signals of different bands, N pre-distortion model coefficient vector sets, and N preset digital frequency conversion coefficient vector sets, wherein each pre-distortion model coefficient vector set comprises one in-band intermodulation distortion model coefficient vector, one cross-band modulation distortion model coefficient vector, and at least one out-of-band intermodulation distortion model coefficient vector, and wherein N is an integer greater than 2;
   a transmission circuit, configured to generate a radio frequency analog signal according to the N pre-distortion output signals;
   a power amplifier, configured to perform amplification processing according to the radio frequency analog signal, so as to generate a radio frequency analog signal that has undergone the amplification processing;
   a feedback circuit, configured to generate N digital intermediate frequency feedback signals according to the radio frequency analog signal that has undergone the amplification processing; and
   a learning circuit, configured to generate the N pre-distortion model coefficient vector sets, and to generate N new pre-distortion model coefficient vector sets according to the N pre-distortion output signals and the N digital intermediate frequency feedback signals.

2. The pre-distortion system according to claim 1, wherein the pre-distortion circuit comprises:
   a first sub-circuit, configured to generate N pre-distortion model vector sets $B_1, B_2, \ldots, B_S, \ldots$, and $B_N$ according to the N digital intermediate frequency signals, wherein $1 \leq S \leq N$, $B_S = (B_S^{(in)}, B_S^{(cross)}, B_S^{(out)_1}, B_S^{(out)_2}, \ldots, B_S^{(out)p})$, P is a quantity of out-of-band intermodulation distortion components corresponding to $B_S$, $B_S^{(in)}$ is an in-band intermodulation distortion model vector in $B_S$, $B_S^{(cross)}$ is a cross-band modulation distortion model vector in $B_S$, and $B_S^{(out)p}$ is an out-of-band intermodulation distortion model vector of a $P^{th}$ out-of-band intermodulation distortion component in $B_S$;
   a second sub-circuit, configured to acquire the N pre-distortion model coefficient vector sets, wherein the N pre-distortion model coefficient vector sets comprise $\omega_1, \omega_2, \ldots, \omega_S, \ldots$, and $\omega_N$, wherein $\omega_S = (\omega_S^{(in)}, \omega_S^{(cross)}, \omega_S^{(out)_1}, \omega_S^{(out)_2}, \ldots, \omega_S^{(out)p})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)p}$ is an out-of-band intermodulation distortion model coefficient vector corresponding to a $P^{th}$ out-of-band intermodulation distortion component in $\omega_S$;
   a third sub-circuit, configured to generate the N preset digital frequency conversion coefficient vector sets, wherein the N preset digital frequency conversion coefficient vector sets comprise $F_1, F_2, \ldots, F_S, \ldots$, and $F_N$, wherein $F_S = (F_S^{(in)}, F_S^{(cross)}, F_S^{(out)_1}, F_S^{(out)_2}, \ldots, F_S^{(out)p})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(out)_P}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal; and a fourth sub-circuit, configured to generate the N pre-distortion output signals according to the N pre-distortion model vector sets, the N pre-distortion model coefficient vector sets, and the N preset digital frequency conversion coefficient vector sets, wherein the N pre-distortion output signals comprise $y_1, y_2, \ldots, y_S, \ldots,$ and $y_N$, and wherein $y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}$.

3. The pre-distortion system according to claim 2, wherein the learning circuit is configured to determine an $S^{th}$ pre-distortion model coefficient vector set in the N new pre-distortion model coefficient vector sets by using the following formulas:

$$\omega_S = (U_l^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

wherein Q is a quantity of sampling points of an $S^{th}$ digital intermediate frequency feedback signal, and $u_s$ is a pre-distortion learning vector set generated according to the $S^{th}$ digital intermediate frequency feedback signal and an $S^{th}$ digital frequency conversion coefficient vector set.

4. The pre-distortion system according to claim 1, further comprising:
a preprocessing circuit, configured to generate the N digital intermediate frequency signals according to N baseband signals of different bands, and to input the N digital intermediate frequency signals into the pre-distortion circuit.

5. A pre-distortion method, comprising:
generating, by a pre-distortion system, N pre-distortion output signals according to N digital intermediate frequency signals of different bands, N pre-distortion model coefficient vector sets, and N preset digital frequency conversion coefficient vector sets, wherein each pre-distortion model coefficient vector set comprises one in-band intermodulation distortion model coefficient vector, one cross-band modulation distortion model coefficient vector, and at least one out-of-band intermodulation distortion model coefficient vector, and wherein N is an integer greater than 2;
generating, by the pre-distortion system, a radio frequency analog signal according to the N pre-distortion output signals;

performing, by the pre-distortion system, amplification processing according to the radio frequency analog signal, so as to generate a radio frequency analog signal that has undergone the amplification processing;
generating, by the pre-distortion system, N digital intermediate frequency feedback signals according to the radio frequency analog signal that has undergone the amplification processing; and
generating, by the pre-distortion system, N new pre-distortion model coefficient vector sets according to the N pre-distortion output signals and the N digital intermediate frequency feedback signals.

6. The method according to claim 5, wherein generating the N pre-distortion output signals comprises:
generating N pre-distortion model vector sets $B_1, B_2, \ldots, B_S, \ldots,$ and $B_N$ according to the N digital intermediate frequency signals, wherein $1 \leq S \leq N$, $B_S = (B_S^{(in)}, B_S^{(cross)}, B_S^{(out)_1}, B_S^{(out)_2}, \ldots, B_S^{(out)_P})$, $B_S^{(in)}$ is an in-band intermodulation distortion model vector in $B_S$, P is a quantity of out-of-band intermodulation distortion components corresponding to $B_S$, $B_S^{(cross)}$ is a cross-band modulation distortion model vector in $B_S$, and $B_S^{(out)_P}$ is an out-of-band intermodulation distortion model vector of a $P^{th}$ out-of-band intermodulation distortion component in $B_S$;
acquiring the N pre-distortion model coefficient vector sets, wherein the N pre-distortion model coefficient vector sets comprise $\omega_1, \omega_2, \ldots, \omega_S, \ldots,$ and $\omega_N$, wherein $\omega_S = (\omega_S^{(in)}, \omega_S^{(cross)}, \omega_S^{(out)_1}, \omega_S^{(out)_2}, \ldots, \omega_S^{(out)_P})$, $\omega_S^{(in)}$ is an in-band intermodulation distortion model coefficient vector in $\omega_S$, $\omega_S^{(cross)}$ is a cross-band modulation distortion model coefficient vector in $\omega_S$, and $\omega_S^{(out)_P}$ is an out-of-band intermodulation distortion model coefficient vector corresponding to a $P^{th}$ out-of-band intermodulation distortion component in $\omega_S$;
generating the N preset digital frequency conversion coefficient vector sets, wherein the N preset digital frequency conversion coefficient vector sets comprise $F_1, F_2, \ldots, F_S, \ldots,$ and $F_N$, wherein $F_S = (F_S^{(in)}, F_S^{(cross)}, F_S^{(out)_1}, F_S^{(out)_2}, \ldots, F_S^{(out)_P})$, $F_S^{(in)}$ is an in-band intermodulation distortion digital frequency conversion coefficient vector in $F_S$, a quantity of elements in $F_S^{(in)}$ is equal to a quantity of elements in $B_S^{(in)}$ and equal to a quantity of elements in $\omega_S^{(in)}$, and the elements in $F_S^{(in)}$ are all 1; $F_S^{(cross)}$ is a cross-band modulation distortion digital frequency conversion coefficient vector in $F_S$, a quantity of elements in $F_S^{(cross)}$ is equal to a quantity of elements in $B_S^{(cross)}$ and equal to a quantity of elements in $\omega_S^{(cross)}$, and the elements in $F_S^{(cross)}$ are all 1; $F_S^{(out)_P}$ is an out-of-band intermodulation distortion digital frequency conversion coefficient vector of a $P^{th}$ out-of-band intermodulation distortion component in $F_S$, a quantity of elements in $F_S^{(out)_P}$ is equal to a quantity of elements in $B_S^{(out)_P}$ and equal to a quantity of elements in $\omega_S^{(out)_P}$, and the elements in $F_S^{(out)_P}$ are all $e^{j2\pi n f_S^{(out)_P}/f_{sample}}$; $f_S^{(out)_P}$ is a difference between a carrier frequency of an $S^{th}$ digital intermediate frequency signal and a center frequency of the $P^{th}$ out-of-band intermodulation distortion component; and $f_{sample}$ is a sampling rate of each digital intermediate frequency signal; and
generating the N pre-distortion output signals according to the N pre-distortion model vector sets, the N pre-distortion model coefficient vector sets, and the N preset digital frequency conversion coefficient vector sets, wherein the N pre-distortion output signals comprise $y_1, y_2, \ldots, y_S, \ldots,$ and $y_N$, and wherein $$y_S = B_S^{(in)} \cdot \omega_S^{(in)} \cdot F_S^{(in)} + B_S^{(cross)} \cdot \omega_S^{(cross)} \cdot F_S^{(cross)} + B_S^{(out)_1} \cdot \omega_S^{(out)_1} \cdot F_S^{(out)_1} + \ldots + B_S^{(out)_P} \cdot \omega_S^{(out)_P} \cdot F_S^{(out)_P}.$$

7. The method according to claim 6, wherein generating the N new pre-distortion model coefficient vector sets comprises:

determining an $S^{th}$ pre-distortion model coefficient vector set in the N new pre-distortion model coefficient vector sets by using the following formulas:

$$\omega_S = (U_1^H U_S)^{-1} U_S^H Y_S$$

$$Y_S = [y_S(n-Q+1), y_S(n-Q+2), \ldots, y_S(n)]^T$$

$$U_S = \begin{bmatrix} u_S(n-Q+1) \\ u_S(n-Q+2) \\ \ldots \\ u_S(n) \end{bmatrix},$$

wherein Q is a quantity of sampling points of an $S^{th}$ digital intermediate frequency feedback signal, and $u_S$ is a pre-distortion learning vector set generated according to the $S^{th}$ digital intermediate frequency feedback signal and an $S^{th}$ digital frequency conversion coefficient vector set.

8. The method according to claim 5, wherein before generating the N pre-distortion output signals, the method further comprises:

generating the N digital intermediate frequency signals according to N baseband signals of different bands.

* * * * *